(12) United States Patent
Ogawa

(10) Patent No.: US 6,310,920 B1
(45) Date of Patent: Oct. 30, 2001

(54) MOVING PICTURE ENCODING APPARATUS

(75) Inventor: Yoichi Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/079,516

(22) Filed: May 15, 1998

(30) Foreign Application Priority Data

May 16, 1997 (JP) .................................................. 9-143132

(51) Int. Cl.[7] .................................................. H04N 7/18
(52) U.S. Cl. ...................... 375/240.17; 348/169; 348/170
(58) Field of Search .................................. 348/699, 700, 348/413, 415, 416, 169, 170; 375/240.16, 240.17, 240.26

(56) References Cited

U.S. PATENT DOCUMENTS

| 5,177,608 | 1/1993 | Ohki et al. . |
| 5,184,216 | 2/1993 | Kobayashi . |
| 5,210,559 | 5/1993 | Ohki . |
| 5,307,170 | * 4/1994 | Itsumi et al. .......................... 348/219 |
| 5,926,209 | * 7/1999 | Glatt ..................................... 348/416 |
| 6,064,436 | * 5/2000 | Okada ................................... 348/416 |

FOREIGN PATENT DOCUMENTS

| 4-126473 | 4/1992 | (JP) . |
| 6-165164 | 6/1994 | (JP) . |
| 06303589 A | 10/1994 | (JP) . |
| 07298247 A | 11/1995 | (JP) . |
| 08125910 A | 5/1996 | (JP) . |

* cited by examiner

Primary Examiner—Andy Rao
(74) Attorney, Agent, or Firm—McGuireWoods LLP

(57) ABSTRACT

Disclosed is a moving picture encoding apparatus which comprises: means for dividing moving picture data picked up by a camera into small blocks and detecting motion vectors corresponding to the small blocks; encoding means for motion-compensating the small blocks based on the motion vectors to perform an inter-frame predictive encoding process; means for extracting a moving object area based on the motion vectors; means for calculating a horizontal and vertical components of a representative vector of the moving object area based on the motion vectors of all or a part of the moving object area; means for setting pan/tilt amounts based on the horizontal component and the vertical component of the representative vector; means for outputting a signal that represents the pan/tilt amounts; and means for causing the encoding means to finely perform quantization only for the small block in the moving object area.

8 Claims, 1 Drawing Sheet

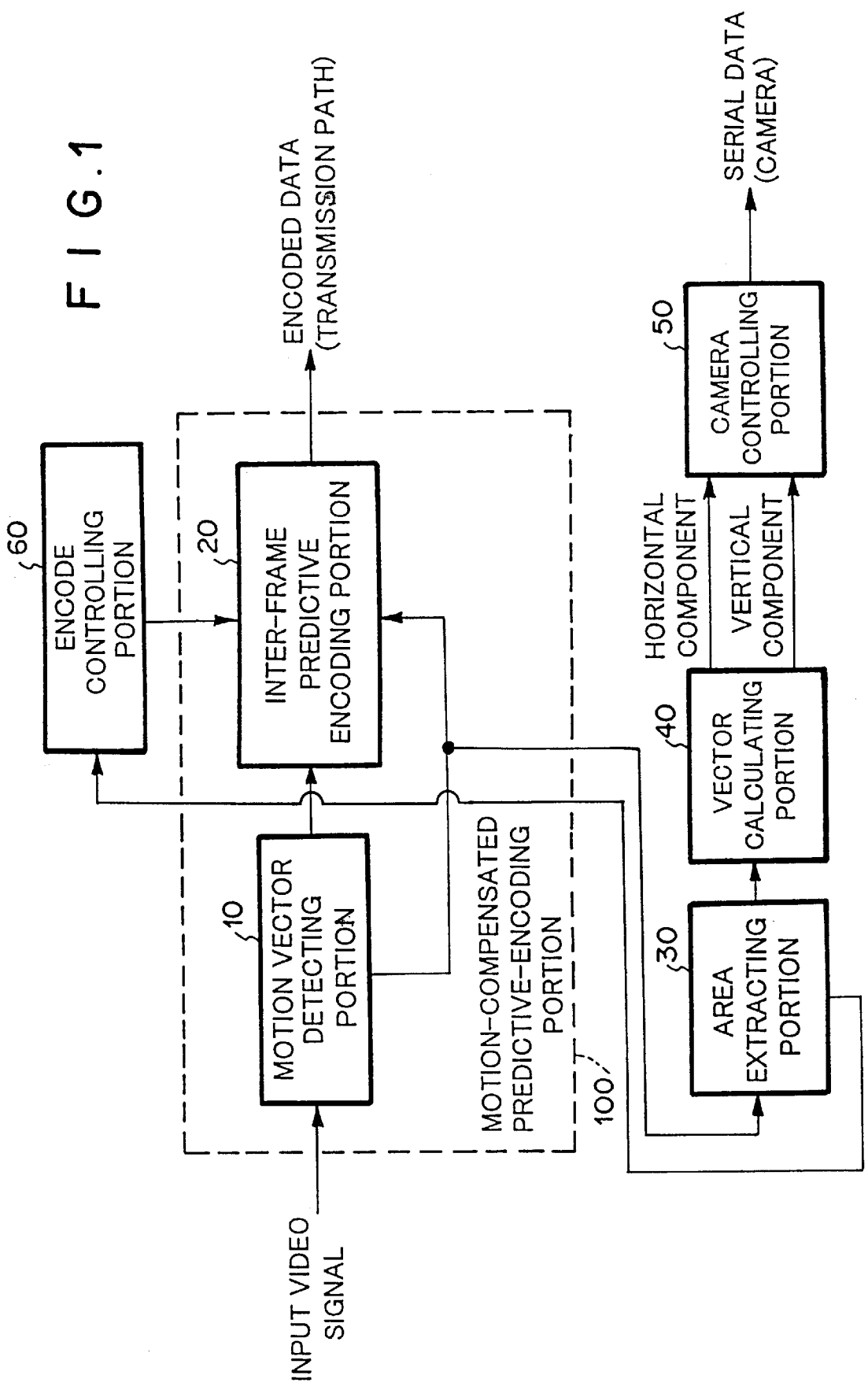

MOVING PICTURE ENCODING APPARATUS

BACKGROUND OF THE INVENTION

1. Field of the Invention

The present invention relates to a moving picture encoding apparatus for performing a motion-compensated interframe predictive encoding and in particular, to a moving picture encoding apparatus having a camera controlling function that causes a camera to automatically track a moving object.

2. Description of the Related Art

Color information is used in one example of the automatic moving object tracking technology for keeping a moving object captured in the angle of a camera by moving the angle of the camera. In this example, the color information is extracted from a video signal in a designated detection block and registered as a specified color. The registered color is used for determining the motion of the object. In "Motion Vector Detection Circuit and Object Tracking Camera Apparatus Using the Circuit" by Matsumura et. al. disclosed in Japanese Patent Laid-Open Publication No. 8-125910, in order to prevent a color in a small area from being registered as a specified color of a block, only the color which is regarded as having high reliability on the basis of correlation is registered.

Japanese Patent Laid-Open Publication No. 4-126473 titled "Automatic Tracking Camera Apparatus" by Fujimoto et. al. discloses another example of the automatic moving object tracking technology. In this example, a contour of a moving object is extracted. Using the information in a closed space surrounded by the contour (color distribution information), a motion vector is detected by a known method. A camera is controlled to pan and tilt according to the motion vector. When the moving object goes out of the angle and become non-trackable, the width and height of the angle is controlled by zoom-out operations.

Still another example disclosed in "Global Zoom/Pan Estimation and Compensation for Video Compensation" (IEEE Conference of Acoustics, Speech and Signal Processing, 1991 M9, 4, pp. 2725–2728) is a method for decreasing the amount of generated information in a moving picture encoding device by globally compensating the motion of a camera using a global motion vector before performing conventional motion compensation. The global motion vector representing, for example, panning/tilting and zooming, is obtained by estimation based on local motion vectors for small blocks. However, the amount of calculation for obtaining the global motion vector from the local motion vectors is vast. Japanese Paten Laid-Open Publication No. 6-165164 titled "Dynamic Picture Processor" by Harasaki Hidenobu discloses a technique for decreasing the amount of the calculation by enlarging a motion vector search area and setting the area as a global area.

The aforementioned examples have the disadvantage that the quality of reproduced picture deteriorates to such a degree that a moving object becomes non-perceptible and the movement of the moving object becomes jerky while the camera is tracking the moving object because of the increase of generated information. Especially, the degree of the deterioration is intolerable when bit rate of transmission is low.

The reason of occurrence of the deterioration is explained as follows: When a camera automatically tracks a moving object, the background behind the moving object moves in the camera angle. Thus, the generated information increases. Then, in order to maintain a predetermined transmission rate, the moving picture encoding apparatus discards a part of generated information by coarsely performing the quantization, and decreasing the frame rate.

As explained above, when the camera tracks a moving object using a motion vector detected by a motion vector detecting means in a motion picture encoding apparatus, the background moves in the camera angle, the generated information increases, the motion picture encoding apparatus coarsely performs the quantization and decreases the frame rate in order to discard a part of the generated information, and the moving object become vague and the movement of the moving object becomes jerky.

SUMMARY OF THE INVENTION

An object of the present invention is to provide a moving picture encoding apparatus comprising a camera controlling means that reduces the generated information originating from the background while the controlled camera is tracking a moving object in order to maintain high-resolution of the moving object and high frame rate.

According to the present invention, there is provided a moving picture encoding apparatus which comprises: motion vector detecting means for dividing moving picture data picked up by a camera into small blocks and detecting motion vectors corresponding to the small blocks; encoding means for motion-compensating the small blocks on the basis of the motion vectors so as to perform an inter-frame predictive encoding process; extracting means for extracting a moving object area on the basis of the motion vectors; calculating means for calculating a horizontal component and a vertical component of a representative vector of the moving object area on the basis of the motion vectors of all or a part of the moving object area; pan/tilt amount setting means for setting pan/tilt amounts on the basis of the horizontal component and the vertical component of the representative vector; outputting means for outputting a signal that represents the pan/tilt amounts; and means for causing the encoding means to finely perform quantization when the small block exists in the moving object area and to coarsely perform the quantization when the small block does not exist in the moving object area.

These and other objects, features and advantages of the present invention will become more apparent in light of the following detailed description of the best mode embodiment thereof, as illustrated in the accompanying drawing.

BRIEF DESCRIPTION OF DRAWING

FIG. 1 is a block diagram showing the structure of a moving picture encoding apparatus according to an embodiment of the present invention.

DESCRIPTION OF PREFERRED EMBODIMENT

Next, with reference to the accompanying drawing, a preferred embodiment of the present invention will be explained. FIG. 1 is a block diagram showing the structure of the embodiment of the present invention.

Referring to FIG. 1, a video signal picked up by a camera to be controlled is supplied to motion vector detecting portion 10 of motion-compensated predictive encoding portion 100. Motion vector detecting portion 10 divides a frame into motion vector detection blocks and detects motion vectors corresponding to the motion vector detection blocks based on the difference between the current frame and the preceding frame.

Inter-frame predictive encoding portion 20 uses the motion vectors corresponding to the motion vector detection blocks detected by motion vector detecting portion 10 for a motion compensation, quantizes the difference between the current frame and the preceding frame that have been motion-compensated, encodes the quantized data to generate encoded data, and outputs the encoded data to a transmission path.

Area extracting portion 30 receives the motion vectors detected by motion vector detecting portion 10, connects motion vector detection blocks that are adjoining one another and have nearly the same motion vector in order to extract a contour, and designates the inside the contour as a moving object area. Alternatively, a set of adjacent motion vector detection blocks that are adjoining one another and have nearly the same motion vector may be designated as a moving object area.

Vector calculating portion 40 obtains a representative vector that represents the motion of the moving object from the motion vectors of blocks in the contour of the extracted moving object area and resolves the representative vector into a horizontal component and a vertical component. It should be noted that the representative vector may be obtained from the entire moving object area, or from a part of the moving object area other than the contour.

Camera controlling portion 50 receives the horizontal component and the vertical component of the representative vector from area extracting portion 30 and outputs a signal for controlling pan/tilt operations of a camera (not shown) connected to the moving picture encoding apparatus corresponding to signs and magnitudes of these components.

In addition, area extracting portion 30 outputs moving object area information for each motion vector detection block to encode controlling portion 60. Encode controlling portion 60 controls the coarseness or fineness of the quantization performed by inter-frame predictive encoding portion 20 for each motion vector detection block.

Next, with reference to FIG. 1, a more concrete example of the embodiment of the present invention will be explained.

A video signal picked up by a camera is supplied to the moving picture encoding apparatus. The video signal is supplied to motion-compensated predictive encoding portion 100. The video signal is supplied to motion vector detecting portion 10 of motion-compensated predictive encoding portion 100. Motion vector detecting portion 10 divides a video frame consisting of 352 pixels×288 lines into 16×16 motion vector detection blocks and detects motion vectors corresponding to the motion vector detection blocks based on the difference between the preceding frame and the current frame. The motion vectors detected by motion vector detecting portion 10 are used for the motion compensation performed in inter-frame predictive encoding portion 20. Inter-frame predictive encoding portion 20 quantizes the difference between the current frame and the preceding frame that have been motion-compensated, encodes the quantized result, and outputs the encoded data to a transmission path.

Area extracting portion 30 receives the motion vectors from motion vector detecting portion 10, connects motion vector detection blocks that are adjoining one another and have nearly the same motion vector in order to extract a contour, and designates the inside of the contour as a moving object area. Vector calculating portion 40 obtains a representative vector based on the motion vectors of the motion vector detecting blocks in the contour and resolves the representative vector into a horizontal component and a vertical component.

For example, the representative vector is resolved into an x-component and a y-component with respect to a rectilinear coordinate of which origin is set at lower left edge of the frame. The two vector components are supplied to camera controlling portion 50. For example, when the x-component is −K pixels and the y-component is +L lines, camera controlling portion 50 outputs the signal that causes the camera connected to the moving picture encoding apparatus to be panned leftward by K' degrees and tilted upward by L' degrees.

In contrast, when the x-component is +K pixels and the y-component is −L lines, camera controlling portion 50 outputs the signal that causes the camera to be panned rightward by K' degrees and tilted downward by L' degrees.

The controlling angle of the camera corresponding to the magnitude of the representative vector can be adjusted corresponding to the angle of view of the camera. For example, a CPU (Central Processing Unit) for calculating the degree of the camera control based on the two components of the representative vector may be included in camera controlling portion 50. In this case, the CPU outputs a camera control command that causes the camera to be panned and tilted by the angles corresponding to the two components of the representative vector as serial data. A level converting circuit in camera controlling portion 50 converts the serial data into a signal which conforms to RS232C interface specification and outputs the resultant signal. The camera inputs the serial data through the serial interface and performs the panning/tilting operations on the basis of the serial data.

Area extracting portion 30 outputs information that represents whether or not each motion vector detection block is in the moving object area to encode controlling portion 60. Encode controlling portion 60 controls the quantization performed by inter-frame predictive encoding portion 20 for each motion vector detection block. In other words, encode controlling portion 60 causes inter-frame predictive encoding portion 20 to finely perform the quantization in the moving object area. In contrast, encode controlling portion 60 causes inter-frame predictive encoding portion 20 to coarsely perform the quantization in the area other than the moving object area.

As explained above, according to the present invention, the camera can be controlled so that it tracks a moving object. The amount of information originating from only the background behind the moving object (namely, the area other than the moving object) is decreased. Thus, a high resolution of the area of the moving object can be maintained.

In other words, according to the present invention, motion vector detection blocks that are adjoining one another and have nearly the same motion vector are connected to one another and extracted as a contour. The inside of the contour is designated as a moving object area. A camera connected to the moving picture encoding apparatus can be controlled by the horizontal component and the vertical component of the representative vector obtained from the motion vectors of the contour of the area. In the inter-frame predictive encoding process, the quantization can be coarsely performed in the area other than the moving object area.

Although the present invention has been shown and explained with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A moving picture encoding apparatus for tracking a moving object comprising:

motion vector detecting means for dividing moving picture data picked up by a camera into small blocks and detecting motion vectors corresponding to said small blocks;

encoding means for motion-compensating said small blocks on the basis of said motion vectors so as to perform an inter-frame predictive encoding process;

extracting means for extracting a moving object area on the basis of said motion vectors;

calculating means for calculating a horizontal component and a vertical component of a representative vector of said moving object area on the basis of said motion vectors of all or a part of said moving object area;

pan/tilt amount setting means for setting pan/tilt amounts on the basis of said horizontal component and said vertical component of said representative vector;

outputting means for outputting a signal that represents said pan/tilt amounts; and means for causing said encoding means to finely perform quantization when said small blocks exist in said moving object area and to coarsely perform said quantization when said small blocks do not exist in said moving object area, wherein said extracting means connects said small blocks which are adjoining one another and of which said motion vectors are nearly the same so as to extract a contour, and designates the inside of said contour as said moving object area.

2. The moving picture encoding apparatus as set forth in claim 1, wherein said extracting means designates a set of said small blocks which are adjoining and of which said motion vectors are nearly the same as said moving object area.

3. A tracking system for controlling a camera to follow a moving object, comprising:

a camera for converting a scene containing a moving object into a video signal representing a plurality of pixels;

means for grouping said plurality of pixels into a plurality of smaller blocks;

means for detecting a motion vector in ones of said smaller blocks;

means for connecting adjoining ones of said smaller blocks having nearly a same motion vector to determine a contour area of a moving object;

calculating means for calculating an x and y components of said contour area; and means for causing said camera to move based on said x and y components to track the moving object.

4. A tracking system for controlling a camera to follow a moving object as recited in claim 3 further comprising:

means for performing a fine quantization for ones of said small blocks in said contour area of the moving object and performing a course quantization for ones of said blocks contained outside said contour area of the moving object.

5. A tracking system for controlling a camera to follow a moving object as recited in claim 3 wherein said means for detecting a motion vector compares a current small block with a previous small block to determine a motion vector.

6. A method for controlling a camera to follow a moving object, comprising:

converting a scene containing a moving object into a video signal representing a plurality of pixels with a camera;

grouping said plurality of pixels into a plurality of smaller blocks;

detecting a motion vector in ones of said smaller blocks;

connecting adjoining ones of said smaller blocks having nearly a same motion vector to determine a contour area of a moving object;

calculating x and y components of said contour area; and controlling the camera to move based on said x and y components to track the moving object.

7. A method for controlling a camera to follow a moving object as recited in claim 6 further comprising the step of:

performing a fine quantization for ones of said small blocks in said contour area of the moving object and performing a course quantization for ones of said blocks contained outside said contour area of the moving object.

8. A method for controlling a camera to follow a moving object as recited in claim 6 further comprising the step of comparing a current small block with a previous small block to determine a motion vector.

* * * * *

UNITED STATES PATENT AND TRADEMARK OFFICE
CERTIFICATE OF CORRECTION

PATENT NO.    : 6,310,920 B1                                           Page 1 of 1
DATED         : October 30, 2001
INVENTOR(S)   : Yoichi Ogawa It is certified that error appears in the above-identified patent and that said Letters Patent is hereby corrected as shown below:

<u>Title page,</u>
Item [54], the Title should read as follows: -- MOVING PICTURE ENCODING APPARATUS FOR CONTROLLING A CAMERA TO AUTOMATICALLY TRACK A MOVING OBJECT --

Signed and Sealed this

Eighteenth Day of June, 2002

*Attest:*

*Attesting Officer*

JAMES E. ROGAN
*Director of the United States Patent and Trademark Office*